(12) United States Patent
Clark

(10) Patent No.: US 7,778,928 B2
(45) Date of Patent: Aug. 17, 2010

(54) SOFTWARE DISTRIBUTION VIA A COMPUTER NETWORK CONNECTION

(75) Inventor: Jack Robert Arron Clark, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 1180 days.

(21) Appl. No.: 10/706,911

(22) Filed: Nov. 14, 2003

(65) Prior Publication Data
US 2005/0108175 A1    May 19, 2005

(51) Int. Cl.
    *G06F 21/00* (2006.01)
(52) U.S. Cl. .............................. 705/59; 705/51; 705/52; 705/53; 705/55; 705/57; 705/58
(58) Field of Classification Search ........................ None
    See application file for complete search history.

(56) References Cited

U.S. PATENT DOCUMENTS

| | | | | |
|---|---|---|---|---|
| 5,598,477 A * | 1/1997 | Berson | ........................ | 380/51 |
| 5,629,980 A * | 5/1997 | Stefik et al. | ................... | 705/54 |
| 5,671,412 A * | 9/1997 | Christiano | ............... | 707/104.1 |
| 7,124,443 B2 * | 10/2006 | Ishibashi et al. | ............... | 726/26 |
| 7,330,711 B2 * | 2/2008 | Hurtta | ......................... | 455/408 |
| 2001/0032189 A1 * | 10/2001 | Powell | ......................... | 705/59 |
| 2001/0044785 A1 * | 11/2001 | Stolfo et al. | ................... | 705/74 |
| 2002/0092014 A1 * | 7/2002 | Shibusawa et al. | ........... | 717/174 |
| 2002/0095387 A1 * | 7/2002 | Sosa et al. | ...................... | 705/65 |
| 2002/0138441 A1 * | 9/2002 | Lopatic | ........................ | 705/59 |
| 2003/0023505 A1 * | 1/2003 | Eglen et al. | ................... | 705/26 |
| 2003/0221112 A1 * | 11/2003 | Ellis et al. | .................... | 713/189 |

OTHER PUBLICATIONS

How the Internet Works, Millennium Ed., Preston Gralla, Indianapolis, Ind. : Que ; Hemel Hempstead : Prentice Hall, 1999.*
Homgren, Charles T., Introduction to Financial Accounting, 3rd Ed., Prentice-Hall, Inc., Englewood Cliffs, New Jersey, 1988.*
White, James J., Uniform Commercial Code, 4th Ed., West Publishing Co. St. Paul, Minnisota, 1995.*

* cited by examiner

*Primary Examiner*—Andrew J. Fischer
*Assistant Examiner*—Joshua Murdough
(74) *Attorney, Agent, or Firm*—Zilka-Kotab, PC

(57) ABSTRACT

A licence ticket 6 obtained by a user 12, such as by purchase from a retail outlet 4, bears a licence key 12 behind a scratch off panel 10. This licence key when entered into a webpage dialog with a download server 16 is validated by that download server 16 as legitimate and used to trigger download and installation of a computer program product onto the user's computer 14.

33 Claims, 3 Drawing Sheets

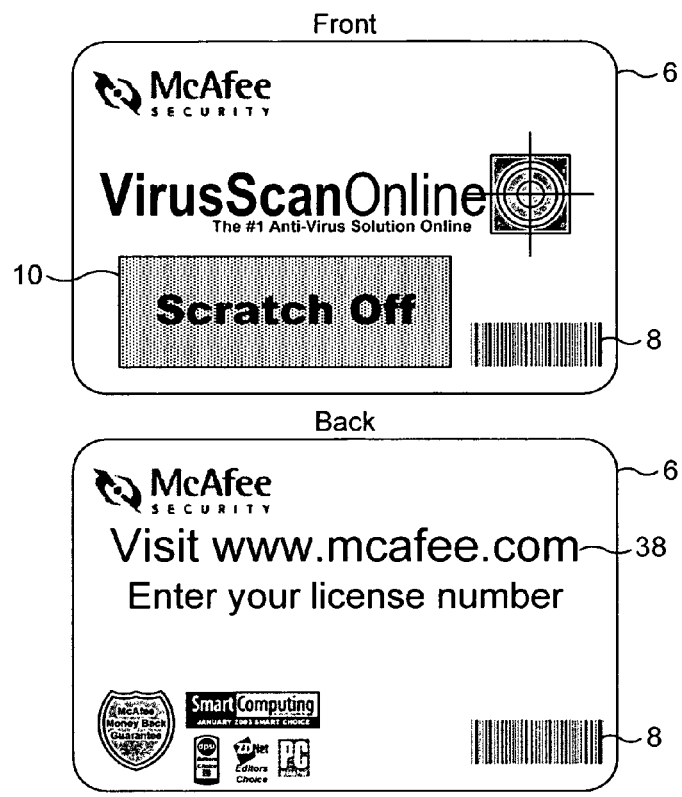
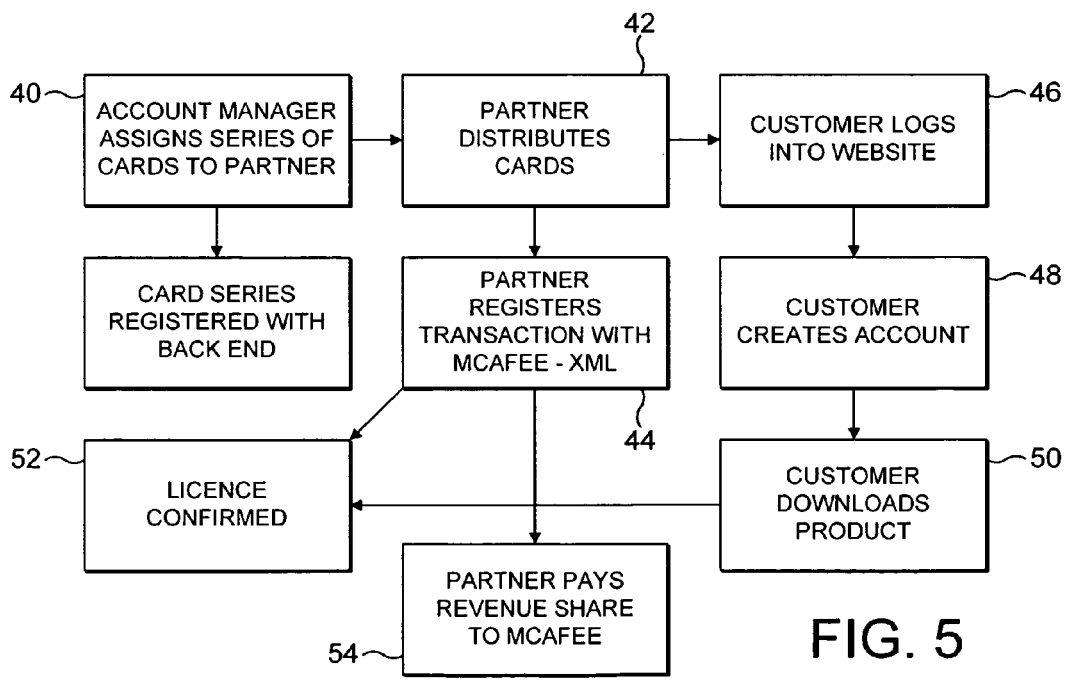
FIG. 4
FIG. 5

SOFTWARE DISTRIBUTION VIA A COMPUTER NETWORK CONNECTION

BACKGROUND OF THE INVENTION

1. Field of the Invention

This invention relates to the field of the distribution of computer program products via a computer network connection.

2. Description of the Prior Art

It is known to distribute computer program products in a variety of different ways. In one form of distribution physical program storage media are distributed from a program supplier to retailers who then sell those physical media to end users. The media concerned are typically compact disks boxed with user manuals, licence key information and the like. There are significant disadvantages associated with this approach. These disadvantages include the problems that physical media that have been distributed go out-of-date when a new version of the computer program becomes available. In such circumstances considerable cost is incurred in returning already distributed media to the supplier and sending out updated media. Furthermore, the cost of producing and distributing the media in the first place is comparatively high.

One way of avoiding the costs and difficulties associated with the distribution of computer software via physical media is to provide on-line purchasing and downloading of computer software. It is know for computer software providers to allow computer software to be purchased, such as by online entry of credit card details, and then downloaded from the download servers of the computer software supplier via an internet connection. Whilst this approach avoids the need to distribute physical storage media which may go out of date, it suffers from the significant disadvantage that many potential customers are resistant to on-line transactions. There is user concern surrounding the security of using sensitive credit card information and other financial information upon on-line systems. Furthermore, such on-line sales mechanisms do not permit the retail display and sales environment to be utilised to inform customers of a product and assist with its sale. Instead, on-line sales tend to rely upon the customer already knowing what they wish to purchase and going online to make such a purchase.

It is known to purchase telephone air-time by purchasing pre-paid vouchers from retail outlets. When a user has purchased such a voucher, then they call a predetermined telephone number and enter a secret number from behind a scratch panel on the voucher which they have purchased. The telephone provider validates the number entered by the user and if valid then credits their airtime account with the value of the voucher.

It is also known for a user to enter a key value via a web interface to enable access to a website. Such numbers can be purchased from retail sources. Examples of such systems are Xbox Live which provides access to online computer gaming for a subscription period and websites such as Kinder Surprise which allow access to a gaming portion of their website for a predetermined period when a code from a purchased product is entered at a web dialog box.

SUMMARY OF THE INVENTION

Viewed from one aspect the present invention provides a method distributing a computer program product, said method comprising the steps of:

obtaining a licence ticket bearing a licence key;

inputting at a user computer a download source computer address of a download source computer of a supplier of said computer program product;

establishing a computer network connection between said user computer and said download source computer;

inputting said licence key at said user computer;

transmitting said licence key from said user computer to said download source computer via said computer network connection;

validating said licence key sent to said download source computer; and if said licence key is valid, then:
  (i) downloading said computer program product to said user computer; and
  (ii) installing said computer program product to be resident upon said user computer.

The invention recognises that in a retail or other non-online environment a user may obtain the product in the form of a licence ticket bearing a licence key. \This licence ticket can then be used to enable the user to download the computer program product via a computer network connection from the computer product supplier. The licence ticket and licence key need not be tied to a particular version of the computer program product and can be used to download the latest version of the computer program product thus avoiding the problems of distributed media becoming out-of-date. Furthermore, the cost of supplying the licence ticket is considerably less than that of supplying a computer program product bearing storage media. Furthermore, the user has no need to enter their credit card details or other potentially sensitive information to download the computer program product they have purchased.

It will be appreciated that the user could obtain the licence ticket in a variety of different ways, for example, licence tickets enabling trial use could be distributed free at trade shows or with magazines or other publications whilst fully effective licence tickets enabling non-time limited use or use for a subscription period may be purchased via conventional retail outlets. As an example, a retail outlet can instead of stocking boxes containing physical media, manuals and the like instead stock licence tickets which are sold to users who then use the licence key borne by that licence ticket to enable them to download the desired computer program product via a internet network connection.

In preferred embodiments of the invention when a licence ticket is purchased a seller of that licence ticket transmits data indicating sale of the licence ticket to the supplier of the computer program product. This sale indicating data can be useful to the supplier of the computer program product in a variety of different ways. As an example, the sale indicating data can be used to validate licence keys associated with particular licence tickets as a security improving measure. Accordingly a computer program product supplier will not enable a particular licence key to be used to validate a download of a computer program product until it has received data from the seller of the associated licence ticket that the licence ticket concerned has been purchased. Another example of the use of such sale indicating data is that a particular licence ticket may be associated with one or more different computer program products. Accordingly, the seller of the licence ticket can collect the appropriate charge from the user and then indicate to the computer program product supplier which computer program products should be allowed to be downloaded when the licence key is received from that user. A further example use of the sale indicating data is that it can be used to trigger a charge being made by the computer program product supplier to the seller of the licence ticket. Thus, a seller may be provided with the licence tickets on a sale-or-return basis whereby they will only be charged by the computer program supplier for those licence tickets which they have sold.

When a user wishes to download a computer program product by entering their licence key, this can also be used to set up a user account associated with the licence key concerned. Such a user account can then be provided with an associated subscription lifetime, if appropriate, and user information collected and associated with the licence key concerned.

In order to enhance the security of the computer program product distribution system, the licence key is preferably hidden upon the licence ticket in a manner that enables it to be non-reversibly revealed by the user, e.g. behind a scratch-off panel. Thus, the licence key which is a valuable commodity enabling a computer program product to be downloaded and then used, is only revealed to the legitimate user who has properly purchased the licence ticket concerned.

The licence tickets preferably bear licence ticket identifiers in addition to the licence keys. In this way, licence tickets which have been released by this computer program product supplier to be available to be obtained by end users, such as by purchase, may be individually or collectively identified and enabled or otherwise selectively processed.

Viewed from another aspect the present invention provides a method installing a computer program product, said method comprising the steps of:

obtaining a licence ticket bearing a licence key;
inputting at a user computer a download source computer address of a download source computer of a supplier of said computer program product;
establishing a computer network connection between said user computer and said download source computer;
inputting said licence key at said user computer;
transmitting said licence key from said user computer to said download source computer via said computer network connection; and
if said licence key is valid, then:
 (i) downloading said computer program product to said user computer; and
 (ii) installing said computer program product to be resident upon said user computer.

Viewed from a further aspect the present invention provides a method supplying a computer program product, said method comprising the steps of:

in response to a connection request from a user computer, establishing a computer network connection between said user computer and a download source computer;
receiving a licence key input by a user at said user computer, said licence key being borne by a licence ticket obtained by a user;
validating said licence key sent to said download source computer; and
if said licence key is valid, then downloading said computer program product to said user computer for installation to be resident upon said user computer.

Viewed from a still further aspect the present invention provides a software supply controlling computer program operable to control a download source computer to supply a computer program product to a user computer, said software supply controlling computer program comprising:

connection establishing code operable in response to a connection request from a user computer to establish a computer network connection between said user computer and said download source computer;
licence key receiving code operable to receive a licence key input by a user at said user computer, said licence key being borne by a licence ticket obtained by a user;
licence key validating code operable to validate said licence key sent to said download source computer; and
downloading code operable if said licence key is valid to download said computer program product to said user computer for installation to be resident upon said user computer.

It will be appreciated that the present technique makes use of a computer network connection and accordingly allows different steps within the method or portions of the apparatus or computer program code concerned to be located in physically different locations or even countries. It will be understood in this context that the present invention also extends to the user side or supplier side methods, programs or apparatus in isolation.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 schematically illustrates an example licence ticket; and

FIG. 5 schematically illustrates a flow of information and activity in accordance with an example of the present technique.

DESCRIPTION OF THE PREFERRED EMBODIMENTS

Figure 1:
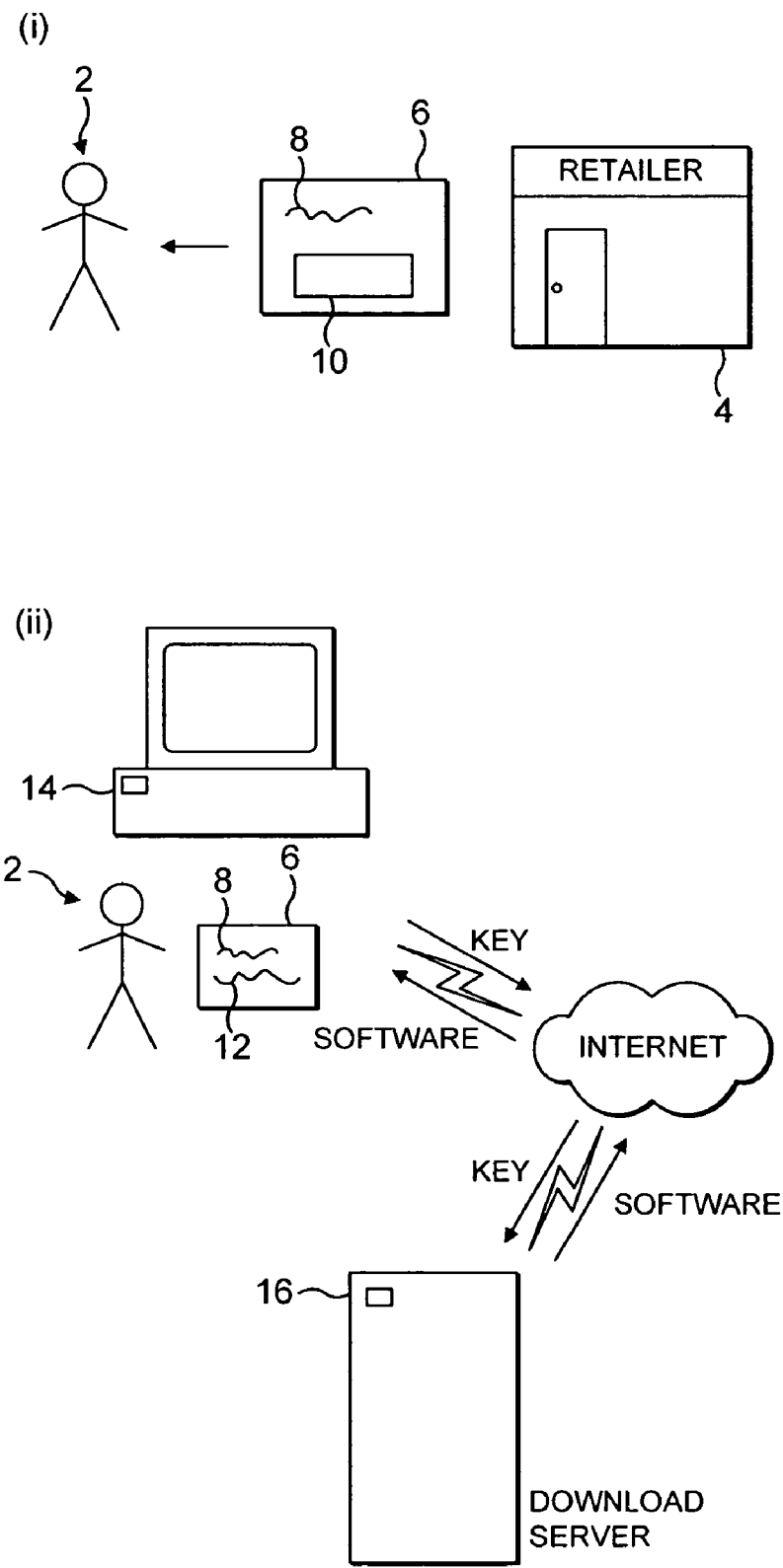
FIG. 1 schematically illustrates a software distribution technique using licence is tickets.

FIG. 1 illustrates in part (i) that a user 2 purchases from a retail outlet 4 a licence ticket 6. This licence ticket 6 bears a licence ticket number 8 as well as a scratch off panel 10 behind which a licence key 12 is printed. The retail outlet 4 will typically stock the licence tickets 6 in preference to physical media which would otherwise bear the computer program product for sale. It is possible that a retailer may stock both the physical media and the licence tickets to provide a choice to the user 2 the way they wished to obtain the computer program product concerned.

Having purchased the licence ticket 6 the user 2 returns to their user computer 14 as illustrated in portion (ii) of FIG. 1 and downloads and installs the computer program product concerned. The user 2 reveals the licence key 12 from behind the scratch off panel 10 of the licence ticket 6. The licence ticket 6 also bears a printed web address of a website operated by the computer program product supplier from which the computer program product may be downloaded upon entry of a valid licence key 12. The user 2 enters the web address unto their computer 14 and thus establishes a computer network connection (preferably a secure connection) with a computer program product supplier's download server 16. The user 2 is then presented with a webpage on their user computer 14 into which they enter their licence key 12. The licence key 12 is then transmitted via the internet to the download server 16. The download server 16 compares the received licence key 12 with a list of valid licence keys to validate or otherwise the received licence key 12. If the licence key 12 received is valid then a download and installation of the associated computer program product can be initiated via the download server 16.

It will be appreciated that the computer program product could be downloaded in its entirety to a storage location upon the user computer 14 and require the user to then activate that download computer program product such as by running a set-up program within the downloaded computer program product. Alternatively, a more sophisticated approach by which an installation program is downloaded to the user computer 14 and then this installation program then actively downloads and installs the appropriate portions of the computer program product purchased.

It will be appreciated in the operations illustrated in FIG. 1 that the user 2 is not required to enter any sensitive personal financial information, such as their credit card details, to enable the on-line downloading of the computer program product they wish to install. However, the computer program product supplier is ensured that the user has legitimately purchased the computer program product since only legitimate purchases will have acquired a valid licence key.

Figure 2:
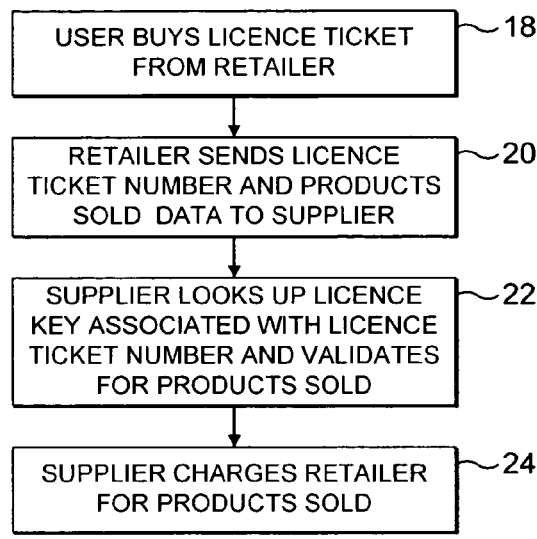
FIG. 2 is a flow diagram schematically illustrating example processing steps occurring when a user buys a licence ticket.

FIG. 2 illustrates schematically a number of processing steps which are performed when a user purchases a licence ticket 6. At step 18, the user buys the licence ticket from the retailer. At step 20 the retailer sends a licence ticket number 8 from the licence ticket sold to the supplier. This licence ticket identifying data may be sent by an online connection, such as embedded within XML data from a point of sale terminal or other computer linked to the computer program product supplier. The licence ticket 6 which has been sold may be dedicated to a particular computer program product or alternatively may be associated with one or more different computer program products. In the case where the licence ticket 6 is associated with more than one computer program product, then when the licence ticket 6 is sold and the appropriate fee paid by the user 2 the retailer will send data to the computer program product supplier indicating which computer program products have been paid for by that user and should be allowed to be downloaded when the licence key 12 from that licence ticket 6 is received by the computer program product supplier.

At step 22 the supplier uses the data received from the retailer to lookup the key associated with the licence ticket number that has been provided and to mark that licence key as valid for use to initiate a download in respect of the one or more products which have been sold.

At step 24 the supplier charges the retailer for the products which have been sold by the retailer. Thus, if the retailer sells the licence ticket for the computer program products concerned for $50 then when the supplier is notified by the retailer of the sale of that licence ticket the supplier will charge the retailer $30.

Figure 3:
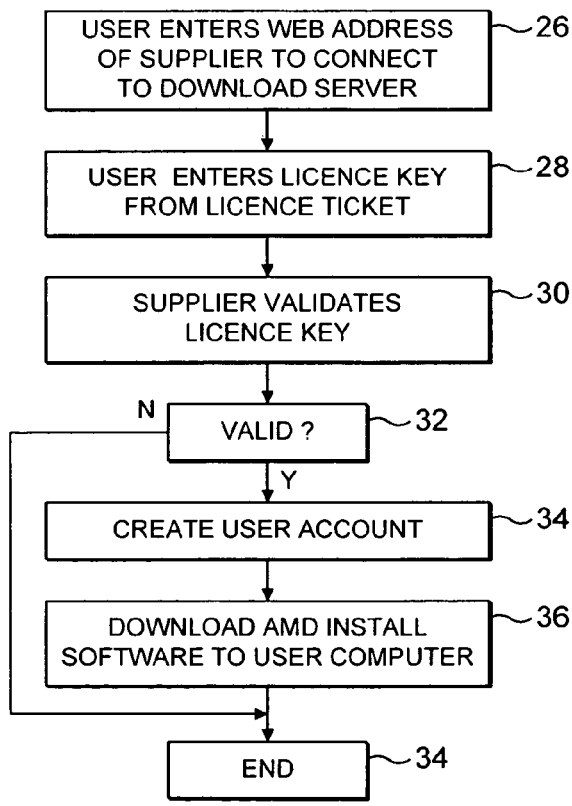
FIG. 3 is a flow diagram schematically illustrating processing steps when a user seeks to download a computer program product using a licence ticket.

FIG. 3 schematically illustrates the processing steps which performed by a user who has purchased the licence ticket 6. At step 26 the user enters the web address of the supplier's download server 16 into their browser program to establish a secure connection to the download server 16. At step 28 a web page returned by the download server 16 to the user's computer 14 is displayed and into this web-page the licence key 12 read from behind the scratch off panel 10 on the licence ticket 6 is entered by the user 2. This licence key 12 is then transmitted via the internet to the download server 16 where the licence key 12 is validated at step 30. The validation takes the form of comparing with a list of licence keys 12 which have known to be sold (step 22 of FIG. 2). The licence key 12 may also be subject to other forms of validation such as internal checking to ensure it has the correct form.

It will be appreciated that the computer program product supplier upon receipt of a licence key 12 may collect useful information concerning the sale of their computer program products. The user 2 may be invited to answer questions concerning the purchase of their product. The user may also be offered additional products or services at this time.

At step 30, if the licence key 12 is not valid then the processing flow is redirected to step 34 at which it is terminated. If the licence key 12 is valid, then processing proceeds to step 34 at which a user account to be associated with that licence key 12 is created. The user account may in the case of a subscription service be set up to have a finite lifetime after which a user will not be permitted to download updates to the computer program product or measures taken to render inoperative the computer program product. The subscription service model is particularly well suited for computer program products such as malware scanners which seek to detect computer viruses, Trojans, worms, banned computer files and the like. Such malware scanners are most effective when they are kept regularly up-to-date with malware definition data and accordingly users of such computer program products regularly and frequently connect to the suppliers' computers to check for updated malware definition data. This allows the computer program product supplier to control the use of the subscription based computer program product.

At step 36, after the user account has been created the computer program product can be downloaded to the user computer 14 and installed upon the user computer 14 so to be resident upon it. The resident computer program after the installation is capable of independent execution upon the user computer 14 whether or not the network connection is present.

FIG. 4 schematically illustrates an example licence ticket 6. The ticket identifier 8 is in this case in the form of a bar code. A scratch off panel 10 is used to cover the licence key 12 such that only a legitimate purchaser of the licence ticket 6 may gain knowledge of the licence key 12 and use this to download the computer program product which has been purchased. The licence ticket 6 also bears the web address 38 of the download server 16 from which the computer program product which has been purchased may be downloaded.

FIG. 5 schematically illustrates the flow of information and actively in accordance with one example of the present technique. Block 40 illustrates the sale by the computer program product supplier or supply by the computer program product supplier of a block of licence cards to a partner or retailer. When such a block of licence tickets have been allocated this confirmed by the appropriate account manager or salesman and logged within the computer program supplier's download server 16 or other computer systems such that a particular licence ticket may then be traced to a particular partner or retailer. In block 42, the partner or retailer distributes the licence tickets such as by sale, free distribution on the front of a magazine or distribution at a trade show. At block 44 the partner or retailer sends data to the computer software supplier indicating which licence tickets 6 have been distributed to users and so are available for legitimate use by users. At block 46 a user who has obtained a licence ticket 6 connects to the program product supplier's website, creates a user account at block 50 and uses the licence key 12 they have obtained at block 50 to download the desired computer program product. The information received from the partner or the seller and the licence key 12 sent by the user at block 50 are used by the computer program product supplier at block 52 to confirm the validity of the licence key 12 concerned prior to the computer program product being downloaded to and installed upon the user's computer 14. Block 54 indicates the transaction data sent by the partner or retailer being used by the computer program product supplier to trigger a charge being made to the partner or retailer for the licence which has been sold.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method for distributing a computer program product, said method comprising the steps of:
   obtaining a licence ticket bearing a licence key;
   inputting at a user computer a download source computer address of a download source computer of a supplier of said computer program product;
   establishing a computer network connection between said user computer and said download source computer;
   inputting said licence key at said user computer;
   transmitting said licence key from said user computer to said download source computer via said computer network connection;
   validating said licence key sent to said download source computer based on said transmitting of said licence key, utilizing said download source computer, wherein said receipt of said data indicating sale of said licence ticket validates said licence key associated with said licence ticket such upon subsequent receipt of said licence key at said download source computer said licence key will be treated as valid; and
   if said licence key is valid, then:
   (i) downloading said computer program product to said user computer; and
   (ii) installing said computer program product to be resident upon said user computer;
   wherein when said licence ticket is purchased a seller of said licence ticket transmits data indicating sale of said licence ticket to said supplier of said computer program product;
   wherein receipt of said data indicating sale of said licence ticket triggers said supplier of said computer program product to charge said seller for a licence to use said computer program product.

2. A method as claimed in claim 1, wherein said licence ticket is obtained via a purchase by a user.

3. A method as claimed in claim 1, wherein said data indicating sale of said licence ticket indicates one or more computer program products of which download and installation is to be allowed by said licence key of said licence ticket.

4. A method as claimed in claim 1, wherein if said licence key is valid, then a user account is created associated with said licence key.

5. A method as claimed in claim 1, wherein said licence key is hidden upon said licence ticket so as to be non-reversibly revealable by a user.

6. A method as claimed in claim 5, wherein said licence key is hidden behind a scratch off covering upon said licence ticket.

7. A method as claimed in claim 1, wherein said licence ticket bears a licence ticket identifier used to identify licence tickets released to be available to be obtained by a user.

8. A method for installing a computer program product, said method comprising the steps of:
   obtaining a licence ticket bearing a licence key;
   inputting at a user computer a download source computer address of a download source computer of a supplier of said computer program product;
   establishing a computer network connection between said user computer and said download source computer;
   inputting said licence key at said user computer;
   transmitting said licence key from said user computer to said download source computer via said computer network connection; and
   if said licence key is valid as determined based on said transmitting of said licence key, utilizing said download source computer, wherein said receipt of said data indicating sale of said licence ticket validates said licence key associated with said licence ticket such upon subsequent receipt of said licence key at said download source computer said licence key will be treated as valid, then:
   (i) downloading said computer program product to said user computer; and
   (ii) installing said computer program product to be resident upon said user computer;
   wherein when said licence ticket is purchased a seller of said licence ticket transmits data indicating sale of said licence ticket to said supplier of said computer program product;
   wherein receipt of said data indicating sale of said licence ticket triggers said supplier of said computer program product to charge said seller for a licence to use said computer program product.

9. A method as claimed in claim 8, wherein said licence ticket is obtained via a purchase by a user.

10. A method as claimed in claim 1, wherein said licence ticket includes a front side and a back side.

11. A method as claimed in claim 1, wherein said licence ticket includes a bar code identifying said licence ticket.

12. A method as claimed in claim 1, wherein validating said licence key includes comparing said licence key with a list of valid licence keys.

13. A method as claimed in claim 1, wherein the download source computer address is printed on the licence ticket.

14. A method as claimed in claim 1, wherein the licence key is only enabled to be used to validate said download of said computer program product when said data indicating sale of said licence ticket is received by said supplier.

15. A method as claimed in claim 8, wherein said data indicating sale of said licence ticket indicates one or more computer program products of which download and installation is to be allowed by said licence key of said licence ticket.

16. A method as claimed in claim 8, wherein if said licence key is valid, then a user account is created associated with said licence key.

17. A method as claimed in claim 8, wherein said licence key is hidden upon said licence ticket so as to be non-reversibly revealable by a user.

18. A method as claimed in claim 17, wherein said licence key is hidden behind a scratch off covering upon said licence ticket.

19. A method as claimed in claim 8, wherein said licence ticket bears a licence ticket identifier used to identify licence tickets released to be available to be obtained by a user.

20. A method for supplying a computer program product, said method comprising the steps of:
   in response to a connection request from a user computer, establishing a computer network connection between said user computer and a download source computer;
   receiving a licence key input by a user at said user computer, said licence key being borne by a licence ticket obtained by said user;

validating said licence key sent to said download source computer based on receipt of said licence key at said download source computer, utilizing said download source computer, wherein said receipt of said data indicating sale of said licence ticket validates said licence key associated with said licence ticket such upon subsequent receipt of said licence key at said download source computer said licence key will be treated as valid; and if said licence key is valid, then downloading said computer program product to said user computer for installation to be resident upon said user computer;

wherein when said licence ticket is purchased a seller of said licence ticket transmits data indicating sale of said licence ticket to a supplier of said computer program product associated with said download source computer;

wherein receipt of said data indicating sale of said licence ticket triggers said supplier of said computer program product to charge said seller for a licence to use said computer program product.

21. A method as claimed in claim 20, wherein said licence ticket is obtained via a purchase by said user.

22. A method as claimed in claim 20, wherein said data indicating sale of said licence ticket indicates one or more computer program products of which download and installation is to be allowed by said licence key of said licence ticket.

23. A method as claimed in claim 20, wherein if said licence key is valid, then a user account is created associated with said licence key.

24. A method as claimed in claim 20, wherein said licence key is hidden upon said licence ticket so as to be non-reversibly revealable by said user.

25. A method as claimed in claim 24, wherein said licence key is hidden behind a scratch off covering upon said licence ticket.

26. A method as claimed in claim 20, wherein said licence ticket bears a licence ticket identifier used to identify licence tickets released to be available to be obtained by said user.

27. A software supply controlling computer program embodied on a tangible computer readable medium operable to control a download source computer to supply a computer program product to a user computer, said software supply controlling computer program comprising:

connection establishing code operable in response to a connection request from a user computer to establish a computer network connection between said user computer and said download source computer;

licence key receiving code operable to receive a licence key input by a user at said user computer, said licence key being borne by a licence ticket obtained by said user;

licence key validating code operable to validate said licence key sent to said download source computer based on receipt of said licence key at said download source computer, utilizing said download source computer, wherein said receipt of said data indicating sale of said licence ticket validates said licence key associated with said licence ticket such upon subsequent receipt of said licence key at said download source computer said licence key will be treated as valid; and downloading code operable if said licence key is valid to download said computer program product to said user computer for installation to be resident upon said user computer;

wherein said software supply controlling computer program is operable such that when said licence ticket is purchased a seller of said licence ticket transmits data indicating sale of said licence ticket to a supplier of said computer program product associated with said download source computer;

wherein said software supply controlling computer program is operable such that receipt of said data indicating sale of said licence ticket triggers said supplier of said computer program product to charge said seller for a licence to use said computer program product.

28. A software supply controlling computer program embodied on a tangible computer readable medium as claimed in claim 27, wherein said licence ticket is obtained via a purchase by said user.

29. A software supply controlling computer program embodied on a tangible computer readable medium as claimed in claim 27, wherein said data indicating sale of said licence ticket indicates one or more computer program products of which download and installation is to be allowed by said licence key of said licence ticket.

30. A software supply controlling computer program embodied on a tangible computer readable medium as claimed in claim 27, wherein if said licence key is valid, then a user account is created associated with said licence key.

31. A software supply controlling computer program embodied on a tangible computer readable medium as claimed in claim 27, wherein said licence key is hidden upon said licence ticket so as to be non-reversibly revealable by said user.

32. A software supply controlling computer program embodied on a tangible computer readable medium as claimed in claim 31, wherein said licence key is hidden behind a scratch off covering upon said licence ticket.

33. A software supply controlling computer program embodied on a tangible computer readable medium as claimed in claim 27, wherein said licence ticket bears a licence ticket identifier used to identify licence tickets released to be available to be obtained by said user.

\* \* \* \* \*